US012532096B2

(12) United States Patent
Wu et al.

(10) Patent No.: US 12,532,096 B2
(45) Date of Patent: Jan. 20, 2026

(54) LOUDSPEAKER MODULE

(71) Applicant: GOERTEK INC., Shandong (CN)

(72) Inventors: Deyue Wu, Shandong (CN); He Liang, Shandong (CN); Minghui Shao, Shandong (CN)

(73) Assignee: GOERTEK INC., Weifang (CN)

( * ) Notice: Subject to any disclaimer, the term of this patent is extended or adjusted under 35 U.S.C. 154(b) by 645 days.

(21) Appl. No.: 17/907,317

(22) PCT Filed: Nov. 7, 2020

(86) PCT No.: PCT/CN2020/127370

§ 371 (c)(1),
(2) Date: Sep. 26, 2022

(87) PCT Pub. No.: WO2021/189867

PCT Pub. Date: Sep. 30, 2021

(65) Prior Publication Data

US 2023/0116758 A1 Apr. 13, 2023

(30) Foreign Application Priority Data

Mar. 26, 2020 (CN) ......................... 202020401124.1

(51) Int. Cl.
*H04R 1/02* (2006.01)
*H04R 1/28* (2006.01)

(52) U.S. Cl.
CPC ............. *H04R 1/021* (2013.01); *H04R 1/023* (2013.01); *H04R 1/2811* (2013.01); *H04R 1/2857* (2013.01)

(58) Field of Classification Search
CPC ...... H04R 1/021; H04R 1/023; H04R 1/2811; H04R 1/2857; H04R 1/2842; H04R 9/06
See application file for complete search history.

(56) References Cited

U.S. PATENT DOCUMENTS

| | | | | |
|---|---|---|---|---|
| 5,432,860 A | 7/1995 | Kasajima et al. | | |
| 2008/0249750 A1* | 10/2008 | Mao | ........................ | G06F 30/20 703/2 |
| 2022/0095055 A1* | 3/2022 | Liang | ........................ | H04R 7/18 |

FOREIGN PATENT DOCUMENTS

| | | | |
|---|---|---|---|
| CN | 101553447 A * | 10/2009 | ........... B22F 3/1021 |
| CN | 101645263 A | 2/2010 | |

(Continued)

OTHER PUBLICATIONS

International Search Report from International Application No. PCT/CN2020/127370 mailed Jan. 11, 2021.

*Primary Examiner* — Kile O Blair
(74) *Attorney, Agent, or Firm* — Shih IP Law Group, PLLC

(57) ABSTRACT

The present disclosure provides a loudspeaker module, comprising a housing and a loudspeaker unit accommodated in a space of the housing, wherein the loudspeaker unit divides the space of the housing into a front sound cavity and a rear sound cavity, a through hole penetrating the housing is provided on the housing at a position corresponding to the front sound cavity, the loudspeaker module further comprises a cover plate covering the through hole, the cover plate comprising at least one metal foam layer and at least one metal sheet layer. Compared with the related art, the cover plate comprises the metal foam layer, so as to weaken the resonance effect of the loudspeaker module and to reduce the distortion of the loudspeaker module, thereby improving the acoustic performance of the loudspeaker module.

13 Claims, 5 Drawing Sheets

(56) References Cited

FOREIGN PATENT DOCUMENTS

| | | | |
|---|---|---|---|
| CN | 206061094 | U | 3/2017 |
| CN | 206908837 | U | 1/2018 |
| CN | 107690106 | A | 2/2018 |
| CN | 207075087 | U | 3/2018 |
| CN | 108174332 | A | 6/2018 |
| CN | 211792019 | U | 10/2020 |

* cited by examiner

LOUDSPEAKER MODULE

TECHNICAL FIELD

The present disclosure relates to a technical field of loudspeakers, in particular, to a loudspeaker module.

BACKGROUND ART

With the rapid development of science and technology, requirements of consumers for electronic products are higher. Based on the requirements of the consumers for the electronic products, the design of the electronic products such as mobile phones tends to be thinner and lighter. As an important acoustic component of portable electronic devices, a loudspeaker module is used to achieve the conversion between electrical signals and acoustic signals, and is an energy converter.

The loudspeaker module includes a housing and a loudspeaker unit accommodated in a space of the housing, the loudspeaker unit divides the space of the housing into a front sound cavity and a rear sound cavity. In the prior art, the housing is made of plastic material and metal material which are hard materials, and an area thereof corresponding to the front sound cavity is a rigid wall. The rigid wall has small damping, small vibration amplitude and limited radiation energy, so the energy of the cavity cannot be effectively transmitted, thus the resonance of the front sound cavity occurs when the loudspeaker module emits sound, and the energy is too high near the high-frequency resonance, which generally significantly amplifies the distortion and the noise, thus affecting the sense of hearing.

Therefore, it is necessary to provide a new loudspeaker module to solve the above technical problems.

SUMMARY

The present disclosure is intended to overcome the above technical problems and to provide a loudspeaker module which weakens the resonance of the front sound cavity, reduces the resonance peak and improves the distortion.

In order to solve the above technical problems, the present disclosure is directed to provide a loudspeaker module including a housing and a loudspeaker unit accommodated in a space of the housing, wherein the loudspeaker unit divides the space of the housing into a front sound cavity and a rear sound cavity, a through hole penetrating the housing is provided on the housing at a position corresponding to the front sound cavity, the loudspeaker module further includes a cover plate covering the through hole, and the cover plate comprises at least one metal foam layer and at least one metal sheet layer.

Preferably, the front sound cavity of the loudspeaker module includes a sound guide channel that communicates with the outside, and the cover plate is provided at one or both of a position facing the loudspeaker unit and a position at the sound guide channel.

Preferably, the cover plate is provided at the position facing the loudspeaker unit.

Preferably, the cover plate is injection-molded with the housing or adhered to the housing.

Preferably, the cover plate includes one metal foam layer and one metal sheet layer, and the metal sheet layer is disposed on a side adjacent to the loudspeaker unit or aside away from the loudspeaker unit.

Preferably, the cover plate includes two metal sheet layers and one metal foam layer, and the metal sheet layers are respectively located on two side surfaces of the metal foam layer.

Preferably, the cover plate includes two metal foam layers and one metal sheet layer, and the metal foam layers are respectively located on two side surfaces of the metal sheet layer.

Preferably, the metal foam layer may be any one of aluminum foam, copper foam, iron foam, nickel foam and alloy foam.

Preferably, the metal foam layer may be an open cell metal foam layer, a semi-closed metal foam layer or a closed cell metal foam layer.

Preferably, the metal foam layer is the open cell metal foam layer.

Preferably, the metal sheet may be formed of any one of aluminum, copper, iron, nickel or alloy.

Preferably, a thickness of the metal foam layer is in a range of 0.05 mm to 1 mm.

Preferably, a thickness of the metal sheet layer is in a range of 0.05 mm to 1 mm.

Compared with the prior art, the loudspeaker module in the present disclosure has the following beneficial effects:

The module housing includes a through hole formed corresponding to the area of the front sound cavity and a cover plate covering the through hole, the cover plate comprises a metal foam layer, the metal foam has high modulus, low density and excellent impact energy absorption characteristics for absorbing the energy of vibration at a specific resonance frequency, so as to weaken the resonance effect of the loudspeaker module and to improve the distortion thereof, thereby improving the acoustic performance of the loudspeaker module.

DETAILED DESCRIPTION OF THE EMBODIMENTS

Various exemplary embodiments of the present disclosure will now be described in detail with reference to the accompanying drawings. It should be noted that unless otherwise specified, components set forth in these embodiments and words such as "above" and "below" that describe structural positions are only for the placement of the components of the present disclosure and do not limit the scope of the present disclosure.

The following description of at least one exemplary embodiment is merely illustrative and is in no way intended to limit the present disclosure and its application or use. In all examples shown and discussed herein, any specific values should be construed as illustrative only and not as a limitation. For those skilled in the art, the present disclosure may have various modifications and variations. Any modification, equivalent replacement, improvement, etc. made within the spirit and principle of the present disclosure shall be included in the protection scope of the present disclosure.

First Embodiment

Figure 1:
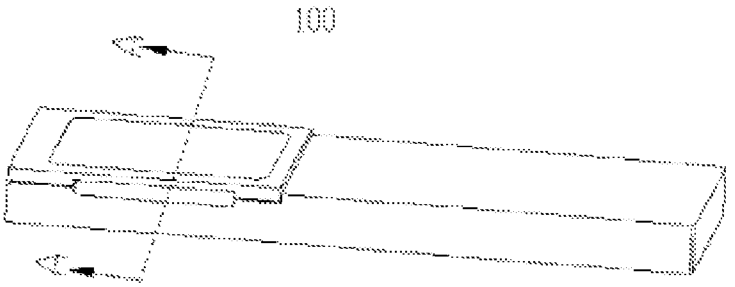
FIG. 1 is a schematic view illustrating a stereoscopic structure of a loudspeaker module of the present disclosure.
Figure 2:
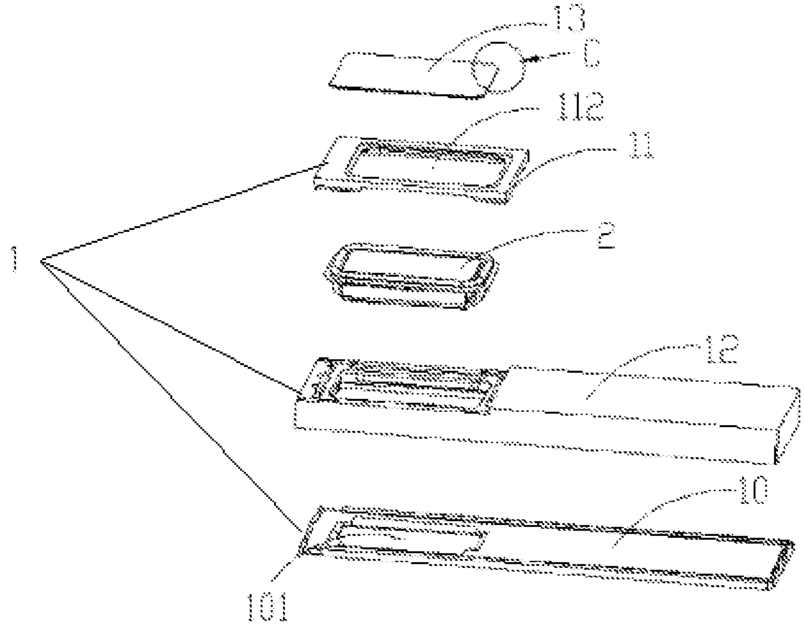
FIG. 2 is a schematic view illustrating an exploded structure of the loudspeaker module of the present disclosure.
Figure 3:
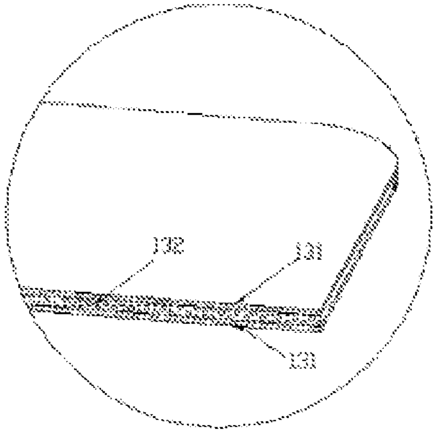
FIG. 3 is a cross-sectional view of the loudspeaker module of the present disclosure taken along line A-A.
Figure 4:
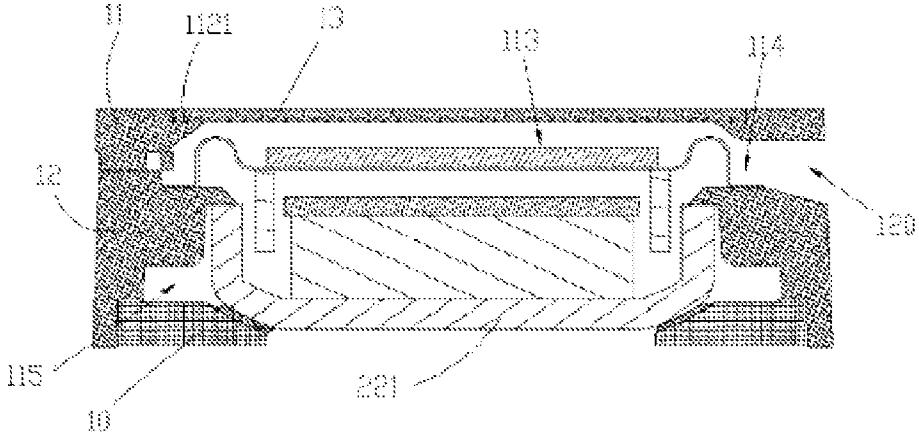
FIG. 4 is a cross-sectional view illustrating a part C of the cover plate of the loudspeaker module according to a first embodiment of the present disclosure.

Referring to FIGS. 1, 2 and 4 together, a loudspeaker module 100 includes a housing 1 and a loudspeaker unit 2 accommodated in the housing 1. The housing 1 includes an upper housing 11, a middle housing 12 and a lower housing 10 which are enclosed to form an accommodation space, and the loudspeaker unit 2 is accommodated in the accommodation space. The loudspeaker unit 2 divides the accommodation space into a front sound cavity 113 and a rear sound cavity 115, and the front sound cavity 113 further includes a sound guide channel 114 that communicates the front sound cavity 113 with the outside. The middle housing 12 is provided with a sound leakage hole (not shown) through which the rear sound cavity 115 communicates with the outside, so as to adjust the acoustic resistance of the rear sound cavity 115 and to balance the air pressure in the cavity.

As shown in FIGS. 2 and 4, a side wall of the upper housing 11 and a side wall of the middle housing 12 are enclosed to form a side sound outlet hole 120, and the side wall of the upper housing 11 at one side and the side wall of the middle housing 12 at one side are respectively provided with a concave groove at positions facing the loudspeaker unit 2. The upper housing 11 is combined with the middle housing 12 and is enclosed with the corresponding side wall of the middle housing 12 to form the side sound outlet hole 120, and the side sound outlet hole 120 faces the front sound cavity 113. The upper housing 11 is provided with a through hole 112 penetrating the upper housing 11 at a position corresponding to the front sound cavity 113, and the loudspeaker module 100 further includes a cover plate 13 covering the through hole 112, the upper housing 11 is provided with a groove 1121 at the through hole 112, the cover plate 13 is fixed on the groove 1121, and the cover plate 13 may be fixed on the groove 1121 by adhering or injection molding.

Preferably, the through hole 112 is disposed facing the loudspeaker unit 2. Of course, the through hole 112 may also be disposed at the position of the sound guide channel 114, and may also be disposed at the position facing the loudspeaker unit 2 and at the position of the sound guide channel 114 at the same time.

In addition, the thickness of the cover plate 13 is smaller than the thickness of the upper housing 11, which can increase the space of the front sound cavity 113 of the loudspeaker module 100, thereby improving the acoustic performance of the sound generating device.

In this embodiment, the cover plate 13 includes one metal foam layer 132 and two metal sheet layers 131, the metal sheet layers 131 are adhered to two side surfaces of the metal foam layer 132, that is, two side surfaces of the cover plate 13 are the metal sheet layers 131. The two metal sheet layers 131 may be the same metal sheets or two different metal sheets.

The metal foam layer may be any one or more of aluminum foam, copper foam, iron foam, nickel foam and alloy foam. The metal sheet may be formed of any one of aluminum, copper, iron, nickel or alloy. In actual use, those skilled in the art can use one or several composite materials thereof according to different characteristics of the materials and specific requirements of the products.

In order to reduce the overall thickness of the cover plate, a thickness of the metal foam layer is in a range of 0.05 mm to 1 mm, and a thickness of the metal sheet layer is in a range of 0.05 mm to 1 mm.

Figure 5:
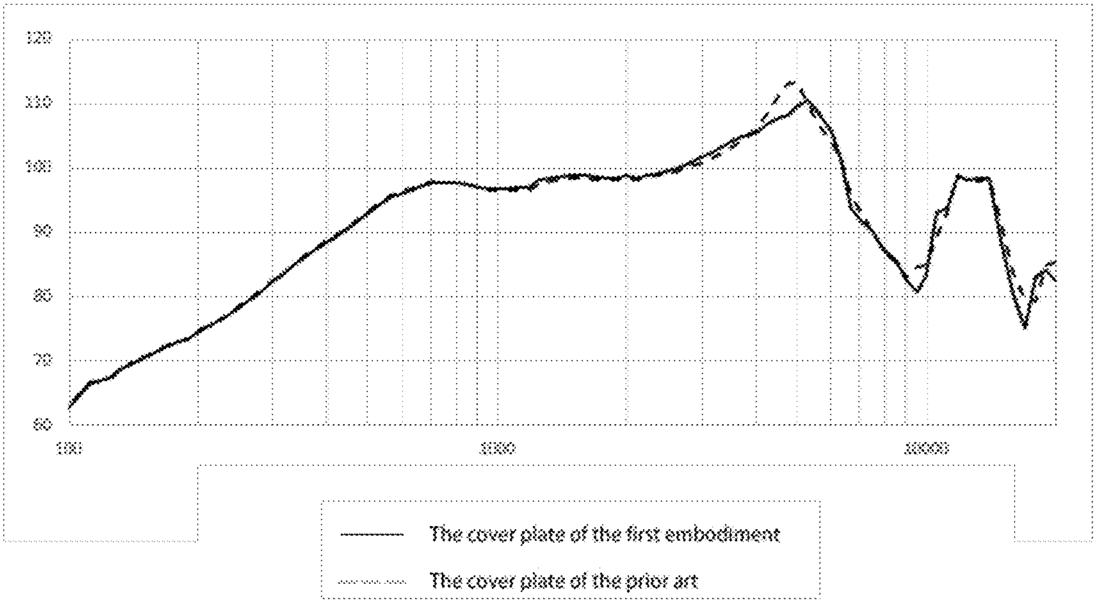
FIG. 5 is a diagram comparing the frequency response curves of the first embodiment of the present disclosure and the prior art.
Figure 6:
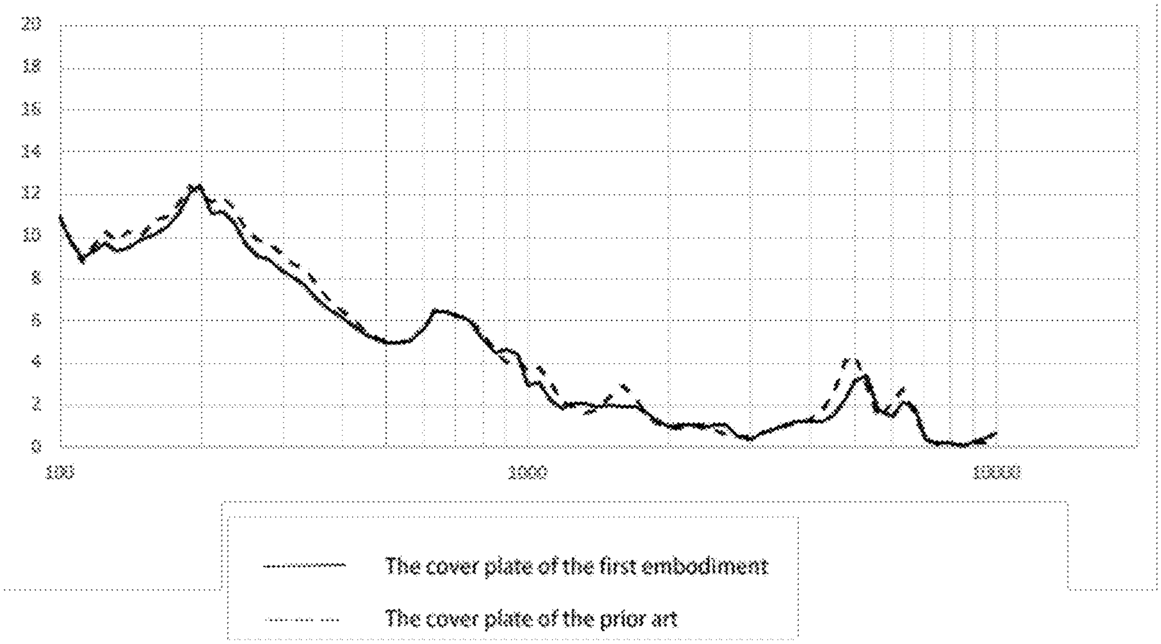
FIG. 6 is a diagram comparing the distortion curves of the first embodiment of the present disclosure and the prior art.

The metal foam layer may be an open cell metal foam layer, a semi-closed metal foam layer or a closed cell metal foam layer, in this embodiment, the open cell metal foam layer is preferable, which helps to reduce the density of the cover plate, reduce the weight of the cover plate, improve the modulus density ratio of the cover plate and reduce the resonance of the front sound cavity. Referring to FIGS. 4 and 5, the frequency response curve and distortion curve of the loudspeaker module in this embodiment between 4 kHz-5 kHz are significantly improved compared to the prior art.

The loudspeaker unit 2 further includes a magnetic circuit system including a magnetic yoke 221, a magnetic steel accommodated in the magnetic yoke and a pole core attached to the magnetic steel. In order to reduce the overall height of the loudspeaker module and to increase the space of the magnetic circuit system, the lower housing 10 is provided with a through hole 101 penetrating the housing at a position corresponding to the magnetic yoke 221, thus the bottom surface of the magnetic yoke 221 is exposed to the lower housing 10, and the bottom surface of the magnetic yoke 221 is on the same horizontal plane as the bottom surface of the lower housing 10.

Second Embodiment

Figure 7:
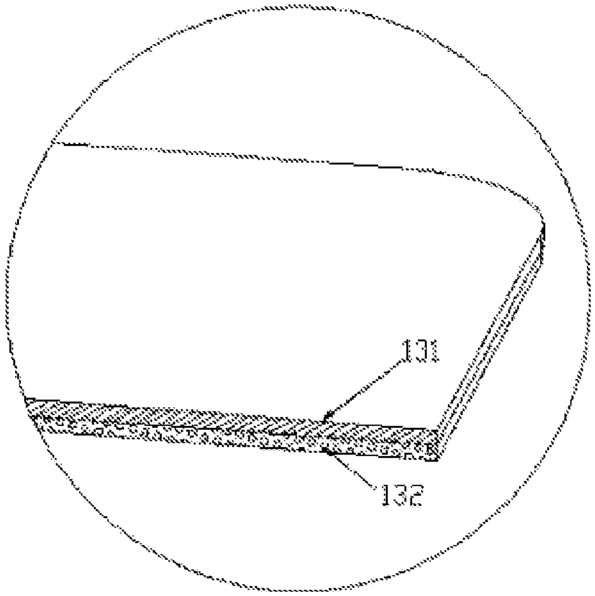
FIG. 7 is a cross-sectional view illustrating a part C of the cover plate of the loudspeaker module according to a second embodiment of the present disclosure.

Referring to FIG. 7, the cover plate 13 according to the second embodiment of the present disclosure includes one metal sheet layer 131 and one metal foam layer 132, and the metal sheet layer 131 is adhered to an upper surface of the metal foam layer 132. It differs from the first embodiment in that the cover plate 13 has a two-layer structure, the upper side surface of the cover plate 13 is a metal sheet layer 131, and the lower side surface thereof is a metal foam layer 132.

Third Embodiment

Figure 8:
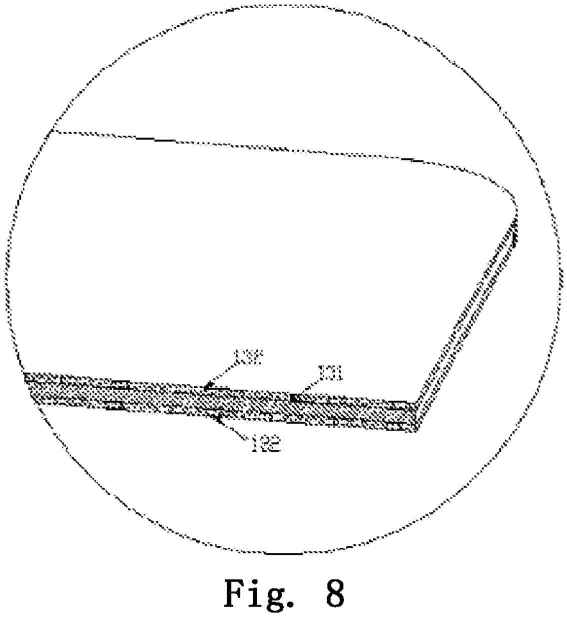
FIG. 8 is a cross-sectional view illustrating a part C of the cover plate of the loudspeaker module according to a third embodiment of the present disclosure.

Referring to FIG. 8, the cover plate 13 according to the third embodiment of the present disclosure includes one metal sheet layer 131 and two metal foam layers 132, and the metal foam layers 132 are adhered to both side surfaces of the metal sheet layer 131. It differs from the first embodiment in that two side surfaces of the cover plate 13 are metal foam layers 132 and the metal sheet layer 131 is a middle layer.

Compared with the related art, the cover plate 13 of the present disclosure comprises the metal foam layer 132, which utilizes the porous structure and excellent impact energy absorption characteristic of the metal foam for absorbing the energy of vibration at a specific resonant frequency, so as to weaken the resonance effect of the loudspeaker module and to improve the distortion thereof, thereby improving the acoustic performance of the loudspeaker module.

The above embodiments are specific embodiments of the present disclosure, and the housing structures in practical applications are not limited to the housing structures described in the above embodiments. In other embodiments, the upper housing and the middle housing of the loudspeaker module may be an integrated structure, that is, the loudspeaker module only includes an upper housing and a lower housing, which are enclosed to form an accommodation space for accommodating the loudspeaker unit. A through hole penetrating the housing is provided in a top wall of the upper housing at a position corresponding to the front sound cavity, a cover plate is covered on the through hole, and a side sound outlet hole is provided on a side wall of the upper housing at a position corresponding to the front sound cavity for emitting sound.

The structure of the cover plate is not limited to the above-mentioned embodiments, and various changes can be made to the present disclosure in forms and details. For example, the cover plate may also be other multi-layer composite structures including a plurality of metal sheet layers and a plurality of metal foam layers, and the metal sheet layers and the metal foam layers are arranged at intervals.

All changes made on the basis of the basic concept of the present disclosure and the achieved technical effects of the present disclosure are within the protection scope of the present disclosure.

What is claimed is:

1. A loudspeaker module, comprising a housing and a loudspeaker unit accommodated in a space of the housing, wherein the loudspeaker unit divides the space of the housing into a front sound cavity and a rear sound cavity, a through hole penetrating the housing is provided on the housing at a position corresponding to the front sound cavity, and wherein the loudspeaker module further comprises a cover plate covering the through hole, and the cover plate comprising at least one metal foam layer and at least one metal sheet layer located on at least one side surface of the metal foam layer.

2. The loudspeaker module of claim 1, wherein the front sound cavity of the loudspeaker module comprises a sound guide channel that communicates with the outside, and wherein the cover plate is provided at one or both of a position facing the loudspeaker unit and a position at the sound guide channel.

3. The loudspeaker module of claim 2, wherein the cover plate is provided at the position facing the loudspeaker unit.

4. The loudspeaker module of claim 3, wherein the cover plate is injection-molded with the housing or adhered to the housing.

5. The loudspeaker module of claim 1, wherein the cover plate comprises one metal foam layer and one metal sheet layer, and the metal sheet layer is disposed on a side adjacent to the loudspeaker unit or a side away from the loudspeaker unit.

6. The loudspeaker module of claim 1, wherein the cover plate comprises two metal sheet layers and one metal foam layer, and the metal sheet layers are respectively located on two side surfaces of the metal foam layer.

7. The loudspeaker module of claim 1, wherein the cover plate comprises two metal foam layers and one metal sheet layer, and the metal foam layers are respectively located on two side surfaces of the metal sheet layer.

8. The loudspeaker module of claim 1, wherein the metal foam layer is any one of aluminum foam, copper foam, iron foam, nickel foam and alloy foam.

9. The loudspeaker module of claim 1, wherein the metal foam layer is an open cell metal foam layer, a semi-closed metal foam layer or a closed cell metal foam layer.

10. The loudspeaker module of claim 9, wherein the metal foam layer is the open cell metal foam layer.

11. The loudspeaker module of claim 1, wherein the metal sheet is formed of any one of aluminum, copper, iron, nickel or alloy.

12. The loudspeaker module of claim 1, wherein a thickness of the metal foam layer is in a range of 0.05 mm to 1 mm.

13. The loudspeaker module of claim 1, wherein a thickness of the metal sheet layer is in a range of 0.05 mm to 1 mm.

* * * * *